United States Patent
Sakai (10) Patent No.: US 9,628,004 B2
(45) Date of Patent: Apr. 18, 2017

(54) MOTOR DRIVE DEVICE

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/022,321

(22) PCT Filed: Aug. 22, 2014

(86) PCT No.: PCT/JP2014/004316
§ 371 (c)(1),
(2) Date: Mar. 16, 2016

(87) PCT Pub. No.: WO2015/040794
PCT Pub. Date: Mar. 26, 2015

(65) Prior Publication Data
US 2016/0233801 A1    Aug. 11, 2016

(30) Foreign Application Priority Data

Sep. 19, 2013   (JP) .................................. 2013-194513

(51) Int. Cl.
*H02P 1/04* (2006.01)
*H02P 6/14* (2016.01)
(Continued)

(52) U.S. Cl.
CPC ................. *H02P 6/14* (2013.01); *H02K 9/20* (2013.01); *H02P 6/06* (2013.01); *H02P 6/18* (2013.01); *H02P 27/06* (2013.01); *H02P 29/68* (2016.02)

(58) Field of Classification Search
CPC ...... H02P 6/14; H02P 6/18; H02P 6/06; H02P 29/0088; H02P 27/06; H02K 9/20
(Continued)

(56) References Cited

U.S. PATENT DOCUMENTS

2004/0207360 A1* 10/2004 Matsushiro ........ B60H 1/00428
                                                                318/811
2009/0256506 A1* 10/2009 Sakai ........................ H02P 6/21
                                                                318/400.09
(Continued)

FOREIGN PATENT DOCUMENTS

JP     H07298633 A    11/1995
JP     2004231170 A    8/2004
(Continued)

OTHER PUBLICATIONS

International Search Report and Written Opinion (in Japanese with English Translation) for PCT/JP2014/004316, mailed Oct. 28, 2014; ISA/JP.

*Primary Examiner* — Eduardo Colon Santana
*Assistant Examiner* — Gabriel Agared
(74) *Attorney, Agent, or Firm* — Harness, Dickey & Pierce, P.L.C.

(57) ABSTRACT

A motor drive device includes: an inverter circuit that has three switching elements corresponding to three phases of a three-phase motor coil, converts a DC applied voltage of a power source to an AC voltage by a PWM, and output the AC voltage to the motor coil; a voltage detection device for the DC applied voltage; and a control device that controls the PWM. The control device selects a first modulation method, for fixing the on/off-state of a part of the switching elements and for switching the on/off-state of the other part of the switching elements, or a second modulation method, for switching the on/off-state of the switching elements corresponding to three phases. The control device switches (Continued)

from the first modulation method to the second modulation method when the DC applied voltage is equal to or greater than a predetermined voltage, and the first modulation method is selected.

10 Claims, 7 Drawing Sheets

(51) Int. Cl.
| | | |
|---|---|---|
| *H02P 6/18* | (2016.01) | |
| *H02P 27/06* | (2006.01) | |
| *H02P 6/06* | (2006.01) | |
| *H02K 9/20* | (2006.01) | |
| *H02P 29/68* | (2016.01) | |

(58) Field of Classification Search
USPC .................................................. 318/400.09
See application file for complete search history.

(56) References Cited

U.S. PATENT DOCUMENTS

| | | |
|---|---|---|
| 2012/0187894 A1 | 7/2012 | Higuchi et al. |
| 2013/0187588 A1* | 7/2013 | Nakata .................... H02P 27/06 |
| | | 318/430 |
| 2014/0312811 A1* | 10/2014 | Liu ..................... H02P 21/0003 |
| | | 318/400.2 |

FOREIGN PATENT DOCUMENTS

| | | |
|---|---|---|
| JP | 2004289985 A | 10/2004 |
| JP | 2009261099 A | 11/2009 |
| JP | 2012029416 A | 2/2012 |
| JP | 2012110171 A | 6/2012 |
| JP | 2013027149 A | 2/2013 |
| WO | WO-2011002015 A1 | 1/2011 |

* cited by examiner

MOTOR DRIVE DEVICE

CROSS REFERENCE TO RELATED APPLICATIONS

This application is a U.S. National Phase Application under 35 U.S.C. 371 of International Application No. PCT/JP2014/004316 filed on Aug. 22, 2014 and published in Japanese as WO 2015/040794 A1 on Mar. 26, 2015. This application is based on and claims the benefit of priority from Japanese Patent Application No. 2013-194513 filed on Sep. 19, 2013. The entire disclosures of all of the above applications are incorporated herein by reference.

TECHNICAL FIELD

The present disclosure relates to a motor drive device that drives a motor by using an inverter circuit.

BACKGROUND ART

A motor drive device in the related art drives a position sensorless three-phase motor by, for example, converting a DC voltage to an AC voltage by means of PWM (Pulse Width Modulation) due to switching of switching elements of an inverter circuit and outputting the resulting AC voltage to a three-phase motor coil. A type of the motor drive device configured as above is known, which reduces a loss by adopting a modulation method by which ON and OFF states of the switching elements of at least one phase are fixed, for example, a two-phase modulation method, as a modulation method used for the PWM (see, for example, Patent Literature 1).

In the motor drive device in the related art as above, however, an applied voltage from a feed source readily fluctuates in a case where, for example, a DC voltage feed source is a storage battery or the like mounted to a mobile object, such as a vehicle. When the applied voltage becomes relatively large, a surge voltage occurring upon switching of a fixed phase in the inverter circuit becomes large. The related art therefore has a problem that the surge voltage exceeds an allowable upper-limit voltage of circuit forming components.

PRIOR ART LITERATURES

Patent Literature

Patent Literature 1: JP-2012-110171

SUMMARY OF INVENTION

It is an object of the present disclosure to provide a motor drive device for restricting the occurrence of a surge voltage even when an applied voltage fluctuates.

According to an aspect of the present disclosure, a motor drive device includes: an inverter circuit that has three switching elements arranged so as to respectively correspond to three phases of a motor having a three-phase motor coil, converts a direct-current applied voltage applied from a power source to an alternating-current voltage by a pulse width modulation according to a switching operation for switching between an on-state and an off-state of each switching element, and output the alternating-current voltage to each phase of the motor coil; a voltage detection device that detects the direct-current applied voltage; and a control device that controls the PWM of the inverter circuit. The control device selectively switches a PWM method between a first modulation method, for fixing the on-state and the off-state of the switching element corresponding to at least one of three phases and for switching the on-state and the off-state of the switching element corresponding to the other at least one of three phases, and a second modulation method, for switching the on-state and the off-state of the switching elements corresponding to three phases. The control device switches the PWM method from the first modulation method to the second modulation method when the direct-current applied voltage detected by the voltage detection device is equal to or greater than a predetermined voltage under a condition that the first modulation method is selected.

The motor drive device as above selects a modulation method by which no fixed phase is formed in the inverter circuit when an applied voltage becomes relatively large. Accordingly, when an applied voltage is relatively large, a surge voltage occurring upon switching of the fixed phase in the inverter circuit no longer occurs. The occurrence of a surge voltage can be thus restricted even when an applied voltage fluctuates.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments to implement the present disclosure will be described with reference to the drawings. In the respective embodiments, portions corresponding to matters described in any preceding embodiment are labeled with same reference numerals and a description is not repeated in some cases. In the respective embodiments, when only a part of the configuration is described, the rest of the configuration is deemed as being the same as the counterpart described in any preceding embodiment. Not only can portions described specifically in the respective embodiments be combined, but also the respective embodiments can be combined partially unless a problem arises from the combination.

First Embodiment

A first embodiment to which the present disclosure is applied will be described with reference to FIG. 1 through FIG. 9.

Figure 1:
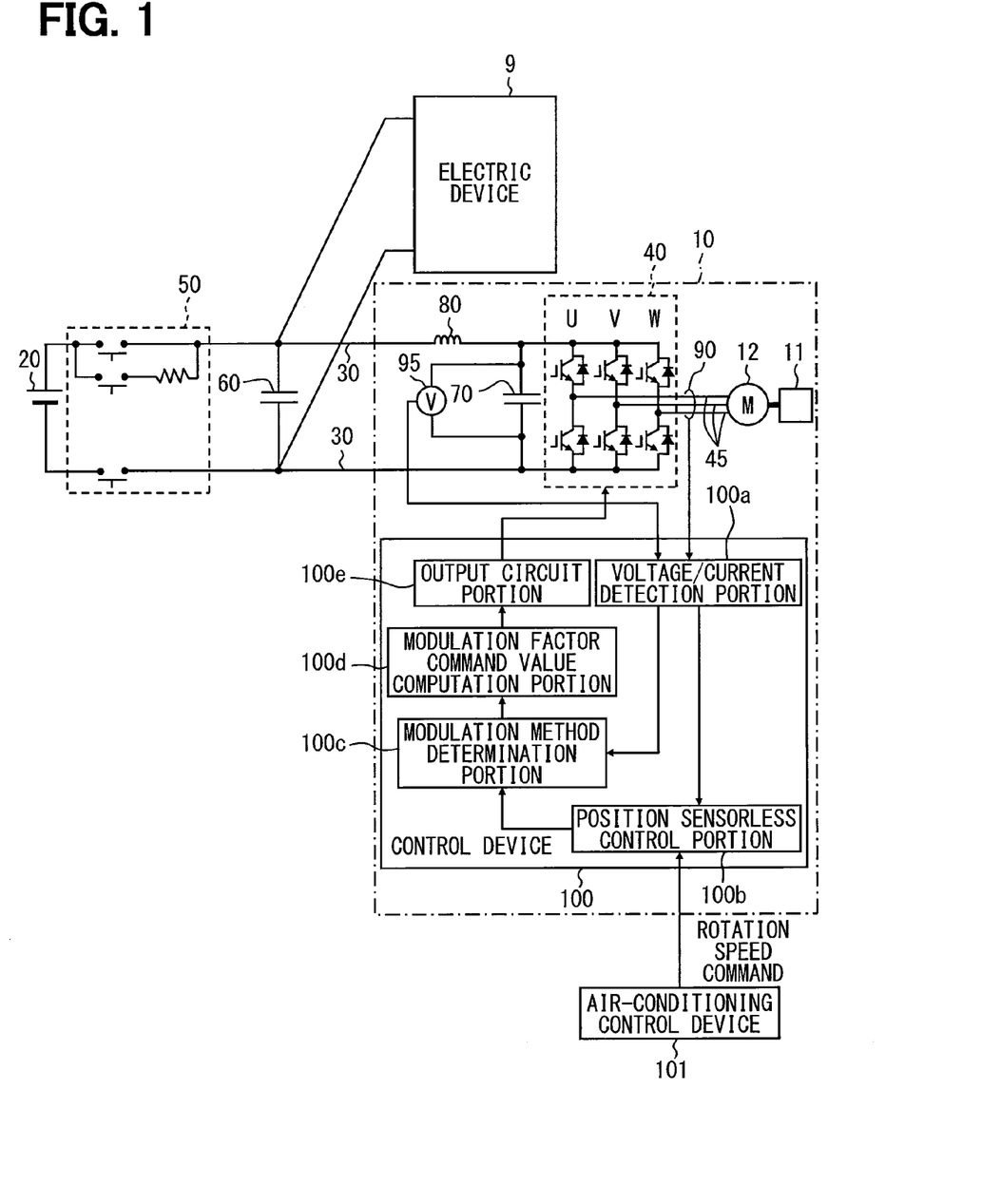
FIG. 1 is a circuit diagram of a motor drive device according to a first embodiment to which the present disclosure is applied, a part of the motor drive device being represented by a block.

As is shown in FIG. 1, a motor drive device of the present embodiment drives a synchronous motor 12 in an electric compressor 10. The synchronous motor 12 is a high-voltage electric motor and corresponds to a motor of the present embodiment. The electric compressor 10 is a compressor disposed in a heat pump cycle of a vehicle air conditioner using, for example, carbon dioxide as a refrigerant, and drives a compression mechanism 11 as a load using the internal synchronous motor 12.

The electric compressor 10 is an electric compressor that compresses a gaseous refrigerant and discharges the compressed refrigerant at the compression mechanism 11. For example, in a case where the refrigerant is a carbon dioxide refrigerant, the compression mechanism 11 discharges the refrigerant compressed to or above a critical pressure. The synchronous motor 12 of the present embodiment is, for example, a synchronous motor having a four-pole three-phase coil to rotationally drive a rotor provided with embedded magnets.

A DC power supply 20 shown in FIG. 1 is a DC voltage feed source formed of a high-voltage battery capable of outputting a voltage of, for example, 288 V. A high-voltage relay system 50 is disposed to a pair of buses 30 extending from the DC power supply 20 to an inverter circuit 40. The high-voltage relay system 50 is formed of multiple relays and a resistive element. The high-voltage relay system 50 is furnished with a function of preventing a rush current from flowing to the buses 30 when a high voltage is applied by starting a voltage application in a path having the resistive element first and then switching the path to a path having no resistive element.

Also, the high-voltage relay system 50 cuts off the feed path in a case where an abnormal state is detected in the electric compressor 10 or the like.

As is shown in FIG. 1, capacitors 60 and 70 as smoothing devices are interposed between a pair of the buses 30 which are power supply paths from the DC power supply 20 to the inverter circuit 40. The capacitor 60 is provided so as to smooth a voltage that fluctuates under the influence of another electric device 9 connected to the buses 30 in parallel with the inverter circuit 40. The electric device 9 can be a motor drive device to run the vehicle, a charger device, a step-down DC-to-DC conversion device, or the like.

For example, in a case where multiple motor drive devices are mounted to the vehicle and the electric device 9 is the motor drive device to run the vehicle, the electric device 9 is a main drive device among the motor drive devices fed from the DC power supply 20 and drive devices including the inverter circuit 40 are subordinate drive devices. The main drive device referred to herein means a device having larger input power fed from the DC power supply 20 than the subordinate drive devices. The main drive device may be a device to which power is fed preferentially when feeding to the both drive devices becomes difficult.

In a case where the input power to the electric device 9 is, for example, ten or more times larger than input power to the electric compressor 10 via the inverter circuit 40, a voltage applied from the DC power supply 20 to the inverter circuit 40 via the buses 30 is likely to fluctuate considerably under the influence of the electric device 9. The capacitor 60 is provided so as to restrict such a voltage fluctuation.

The capacitor 70 is provided so as to absorb a surge and ripples occurring upon switching of switching elements of the inverter circuit 40. The capacitor 70 is a capacitor having a relatively small capacitance and therefore contributes to a reduction of a component physical size.

A coil 80 is disposed between a connection point of one bus 30 and the capacitor 60 and a connection point of the one bus 30 and the capacitor 70. The coil 80 is provided so as to restrict interference of the two capacitors 60 and 70 provided in parallel between the buses 30. The coil 80 is provided with the purpose of changing a resonance frequency generated due to a relation between the capacitor 60 and the capacitor 70. The capacitor 70, which is a capacitor element, and the coil 80, which is a coil element, together form so-called an LC filtering circuit.

The coil 80 is so-called a normal coil. Alternatively, the coil 80 may be a coil component of a wire connecting the capacitor 60 and the capacitor 70. Further, the coil 80 may be so-called a common coil interposed between the capacitor 60 and the capacitor 70.

The inverter circuit 40 is formed of arms of three phases, a phase U, a phase V, and a phase W, corresponding to a stator coil of the synchronous motor 12, and converts a DC voltage inputted therein via the buses 30 to an AC voltage by means of PWM to output the resulting AC voltage.

The U-phase arm is formed of an upper arm on an upper side in the drawing and a lower arm on a lower side in the drawing connected in series. The upper arm is made up of a switching element and a freewheeling diode in back-to-back connection and the lower arm is also made up of a switching element and a diode in back-to-back connection. An output line 45 extended from a connection portion of the upper arm and the lower arm of the U-phase arm is connected to a motor coil. The V-phase arm and the W-phase arm are formed of switching elements and diodes in the same manner and output lines 45 extended from the respective connection portions of the upper arms and the lower arms are connected to the motor coil.

The switching element can be an element, for example, an IGBT (Insulated Gate Bipolar Transistor). Alternatively, an arm made up of a switching element and a diode may be a switching element of, for example, an RCIGBT (Reverse Conducting Insulated Gate Bipolar Transistor), which is a power semiconductor formed by integrating an IGBT and a reverse conducting diode in one chip.

The output lines 45 are provided with a current detection device 90 that detects a current flowing through the output line 45 of one or more than one phase. The current detection device 90 is capable of adopting a current transformer method, a hole element method, a shunt resistor method, and so on. The current detection device 90 outputs detected current information to a control device 100.

A voltage detection device 95 is provided between a pair of the buses 30, for example, at a region where the capacitor 70 is connected and detects a voltage between the buses 30. The voltage detection device 95 is capable of adopting a resistance voltage dividing method and the like. The voltage detection device 95 outputs detected voltage information to the control device 100.

The inverter circuit 40 is provided with, for example, a thermistor as a temperature detection device that detects a temperature of the switching elements. The element temperature detected by the thermistor is outputted to the control device 100.

The control device 100, which corresponds to a control device, controls the driving of the synchronous motor 12 by controlling switching actions of the respective switching elements of the inverter circuit 40. On the basis of motor coil current value information and the like inputted therein, the control device 100 generates a PWM wave, which is a switching signal and outputted to the inverter circuit 40.

The control device 100 is formed of hardware, for example, a microcomputer or a dedicated IC. The control device 100 has a voltage and current detection portion 100a, a position sensorless control portion 100b, a modulation method determination portion 100c, a modulation factor command value computation portion 100d, and an output circuit portion 100e.

The voltage and current detection portion 100a receives a current information signal from the current detection device 90 and a voltage information signal from the voltage detection device 95 as input signals and converts the input signals to a physical quantity, which is a state quantity used for a control computation. The voltage and current detection portion 100a converts, for example, an analog detection value inputted therein to a digital value.

The position sensorless control portion 100b receives a compressor rotation speed command from an air-conditioning control device 101, which is a higher-level control device, a state quantity from the voltage and current detection portion 100a, and the like as input information and outputs control information on the basis of which a position sensorless control on a motor rotation speed with respect to a current is realized. The compressor rotation speed command corresponds to a motor target rotation speed. The position sensorless control portion 100b outputs a modulation factor of each phase by performing a computation to apply a position sensorless vector control to the synchronous motor 12. The modulation factor is a ratio of strength of an applied voltage signal to each phase with respect to strength of a carrier wave. The modulation factor is a ratio of amplitude of a modulation wave, which is an applied voltage command, with respect to amplitude of a carrier wave.

The modulation method determination portion 100c receives voltage information from the voltage and current detection portion 100a and modulation factor information from the position sensorless control portion 100b as input information and determines a modulation method to be adopted among multiple modulation methods.

The modulation factor command value computation portion 100d calculates a modulation signal using the modulation method determined in the modulation method determination portion 100c. In other words, the modulation factor command value computation portion 100d computes a modulation factor command value by the modulation method selected in the modulation method determination portion 100c. A computation result is outputted to the output circuit portion 100e.

The output circuit portion 100e is formed of a part that generates a drive signal to make the inverter circuit 40 operate. The output circuit portion 100e receives the modulation factor command value from the modulation factor command value computation portion 100d as an input value and outputs a PWM wave signal, which is a pulsed drive signal, to the inverter circuit 40. The output circuit portion 100e generates a switching signal that makes the switching elements of the inverter circuit 40 operate on the basis of the modulation factor command value and outputs the switching signal to the inverter circuit 40.

As can be obvious from FIG. 1, a configuration including the inverter circuit 40, the capacitor 70, the coil 80, and the control device 100 is the motor drive device in the present embodiment that drives the synchronous motor 12 by supplying power to the synchronous motor 12.

Figure 2:
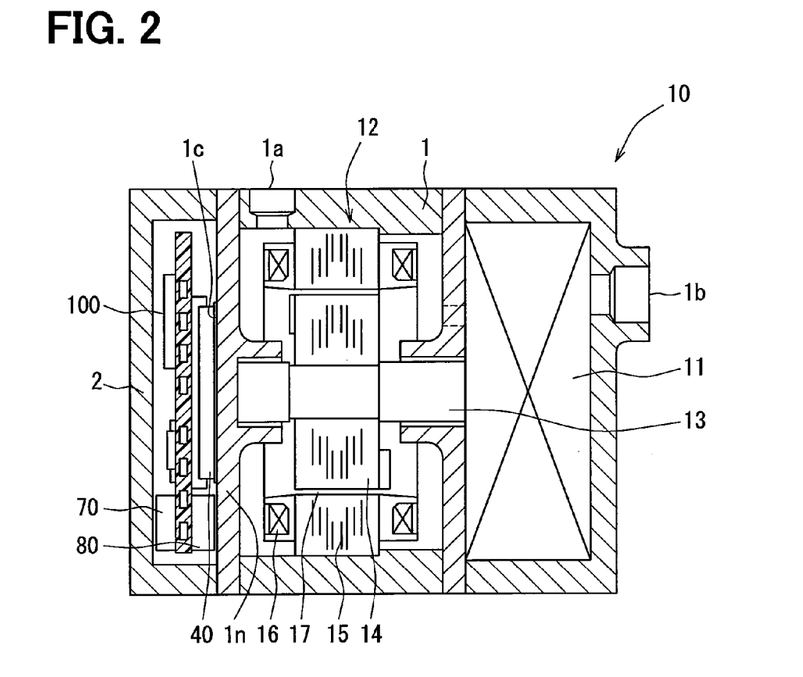
FIG. 2 is a cross section schematically showing a structure of an electric compressor.

The electric compressor 10 is disposed in, for example, an engine room of an automobile. The electric compressor 10 together with a radiator, a decompressor, and an evaporator forms a refrigeration cycle device of the vehicle air conditioner.

As is shown in FIG. 2, the electric compressor 10 includes a housing 1. The housing 1 is made of metal that transfers heat well, such as an aluminum material and aluminum alloy, and formed in substantially a cylindrical shape. The housing 1 is provided with a refrigerant inlet port 1a and a refrigerant discharge port 1b.

The refrigerant inlet port 1a is disposed to the housing 1 on the left side in the drawing, which is one side in an axial direction. The refrigerant inlet port 1a is provided so as to penetrate through a cylindrical portion of the housing 1 in a radial direction. A refrigerant from a refrigerant outlet of the evaporator flows into the refrigerant inlet port 1a. The refrigerant discharge port 1b is disposed to the housing 1 on the other side in the axial direction. The refrigerant is discharged from the refrigerant discharge port 1b toward a refrigerant inlet of the radiator.

The electric compressor 10 is formed of the compression mechanism 11, the synchronous motor 12, and a drive circuit portion including the inverter circuit 40 as well as an inverter cover 2, and so on. The synchronous motor 12 is formed of a rotation shaft 13, a rotor 14, a stator core 15, a stator coil 16, which is a motor coil, and so on.

The rotation shaft 13 is disposed inside the housing 1. An axial direction of the rotation shaft 13 coincides with the axial direction of the housing 1. The rotation shaft 13 is supported on two bearings in a rotatable manner. The rotation shaft 13 transmits a rotational drive force received from the rotor 14 to the compression mechanism 11. The bearings are supported on the housing 1.

The rotor 14 includes, for example, embedded permanent magnets. The rotor 14 is shaped like a tube and fixed to the rotation shaft 13. The rotor 14 rotates with the rotation shaft 13 according to a rotating field generated from the stator core 15.

The stator core 15 is disposed inside the housing 1 on an outer peripheral side of the rotor 14 in a radial direction. The stator core 15 is shaped like a tube and an axial direction of the tube coincides with the axial direction of the rotation shaft 13. A clearance is provided between the stator core 15 and the rotor 14. The clearance forms a refrigerant path 17 for the refrigerant to flow in the axial direction of the rotation shaft 13.

The stator core 15 is made of a magnetic body and supported on an inner peripheral surface of the housing 1. The stator coil 16 is wound around the stator core 15. The stator coil 16 generates a rotating field.

The compression mechanism 11 is disposed on the other side in the axial direction, which is the right side of the synchronous motor 12 in the drawing. The compression mechanism 11 is, for example, a scroll compressor formed of a fixed scroll and a movable scroll, and draws in, compresses, and discharges the refrigerant by turning the movable scroll with a rotational drive force from the rotation shaft 13 of the synchronous motor 12. The compression mechanism 11 is not limited to a scroll type. For example, a rotary type having vanes may be used instead.

The inverter circuit 40 is attached to an attachment surface 1c of the housing 1. More specifically, the inverter circuit 40 is disposed in such a manner that a package unit containing multiple switching elements comes into press-contact with the attachment surface 1c via, for example, an electrical insulating radiation sheet. The attachment surface 1c is provided on an outer surface of a thick portion 1n on an opposite side to the compression mechanism 11, which is an end wall portion on the left side in the drawing in the axial direction of the housing 1.

The inverter circuit 40 forms a drive circuit that generates a three-phase voltage to drive the synchronous motor 12. The inverter cover 2 is made of, for example, metal or resin and provided so as to cover the inverter circuit 40. The inverter cover 2 is fastened to the housing 1 with, for example, unillustrated screws.

The electric compressor 10 shown in FIG. 2 includes a configuration enclosed by an alternate long and short dash line of FIG. 1. For example, the capacitor 70, the coil 80, the control device 100, and so on mounted to a board together with the inverter circuit 40 are also disposed in a chamber shown in FIG. 2 in which the inverter 40 is installed.

When a three-phase drive current flows through the stator coil 16 of the synchronous motor 12 shown in FIG. 2, a rotating field is generated from the stator core 15 and a rotation force is generated for the rotor 14. Accordingly, the rotor 14 rotates with the rotation shaft 13. The compression mechanism 11 turns with a rotational drive force from the rotation shaft 13 and draws in the refrigerant.

The indrawn refrigerant under low temperature and pressure from the evaporator side flows into the housing 1 from the refrigerant inlet port 1a. The indrawn refrigerant flows along the thick portion 1n and subsequently flows toward the compression mechanism 11 by passing the refrigerant path 17. The refrigerant flows inside the housing 1 by turning about the axial line due to rotations of the rotor 14. The indrawn refrigerant is compressed in the compression mechanism 11 and discharged toward the radiator from the refrigerant discharge port 1b. The electric compressor 10 increases an amount of the refrigerant to be drawn in, compressed, and discharged in the compression mechanism 11 with an increase of the rotation speed of the synchronous motor 12.

On the other hand, the inverter circuit 40 in operation generates heat. Heat generated by the inverter circuit 40 is transmitted to the indrawn refrigerant that flows along the thick portion 1n of the housing 1 via the thick portion 1n. Consequently, the drive circuit portion including the inverter circuit 40 can be cooled by the indrawn refrigerant.

Meanwhile, the stator coil 16 generates heat when conducting the three-phase drive current. Heat generated from the stator coil 16 is transmitted to the indrawn refrigerant in the refrigerant path 17 via the stator core 15. Consequently, the stator core 15 and the stator coil 16 can be cooled by the indrawn refrigerant. A refrigerant path may be provided in a part of a space between the housing 1 and the stator core 15 in order to cool the stator core 15 and the stator coil 16.

A control operation of the control device 100 will now be described with reference to FIG. 3. While the electric compressor 10 is fed and rotationally driven, the control device 100 firstly obtains an input voltage VB, which is an applied voltage applied to the inverter circuit 40 via the buses 30, in the voltage and current detection portion 100a (Step 110). Subsequently, a modulation factor Mod of a fundamental modulation wave is calculated in the position sensorless control portion 100b on the basis of a compressor rotation speed command from the air-conditioning control device 101, a state quantity of the load calculated in the voltage and current detection portion 100a, and so on (Step 120). The modulation factor Mod calculated at Step 120 is determined from a ratio of the input voltage VB and voltages of the respective phases.

After Step 110 and 120 are performed, a determination is made in the modulation method determination portion 100c as to whether the input voltage VB is as high as or higher than a predetermined voltage Va (Step 130). When it is determined at Step 130 that the input voltage VB is below the predetermined voltage Va, a two-phase modulation method, which is a normal control method, is selected (Step 140).

When it is determined at Step 130 that the input voltage VB is as high as or higher than the predetermined voltage Va, a determination is made as to whether the modulation factor Mod is equal to or greater than a predetermined value Ma (Step 150). The modulation factor Mod is calculated as an absolute value and compared with the predetermined value Ma which is a positive value. The predetermined value Ma is an approximate value of 1 slightly smaller than 1.

When it is determined at Step 150 that the modulation factor Mod is less than the predetermined value Ma, a three-phase modulation method using a third-order correction, which is a first surge restriction control method, is selected (Step 160). On the other hand, when it is determined at Step 150 that the modulation factor Mod is equal to or greater than the predetermined value Ma, a three-phase modulation method using a third-order correction with a modulation factor limit, which is a second surge restriction control method, is selected (Step 170). The modulation factor limit at Step 170 limits the modulation factor to be, for example, less than Ma.

When any of Steps 140, 160 and 170 is performed and the modulation method is selected in the modulation method determination portion 100c, a modulation factor command value is computed in the modulation factor command value computation portion 100d according to the selected modulation method (Step 180).

After Step 180 is performed, a computation result of the modulation factor command value is outputted to the output circuit portion 100e. The modulation factor command value inputted into the output circuit portion 100e is outputted to the inverter circuit 40 as a switching signal that makes the switching elements switch (Step 190). After Step 190 is performed, the control device 100 returns to Step 110.

Figure 3:
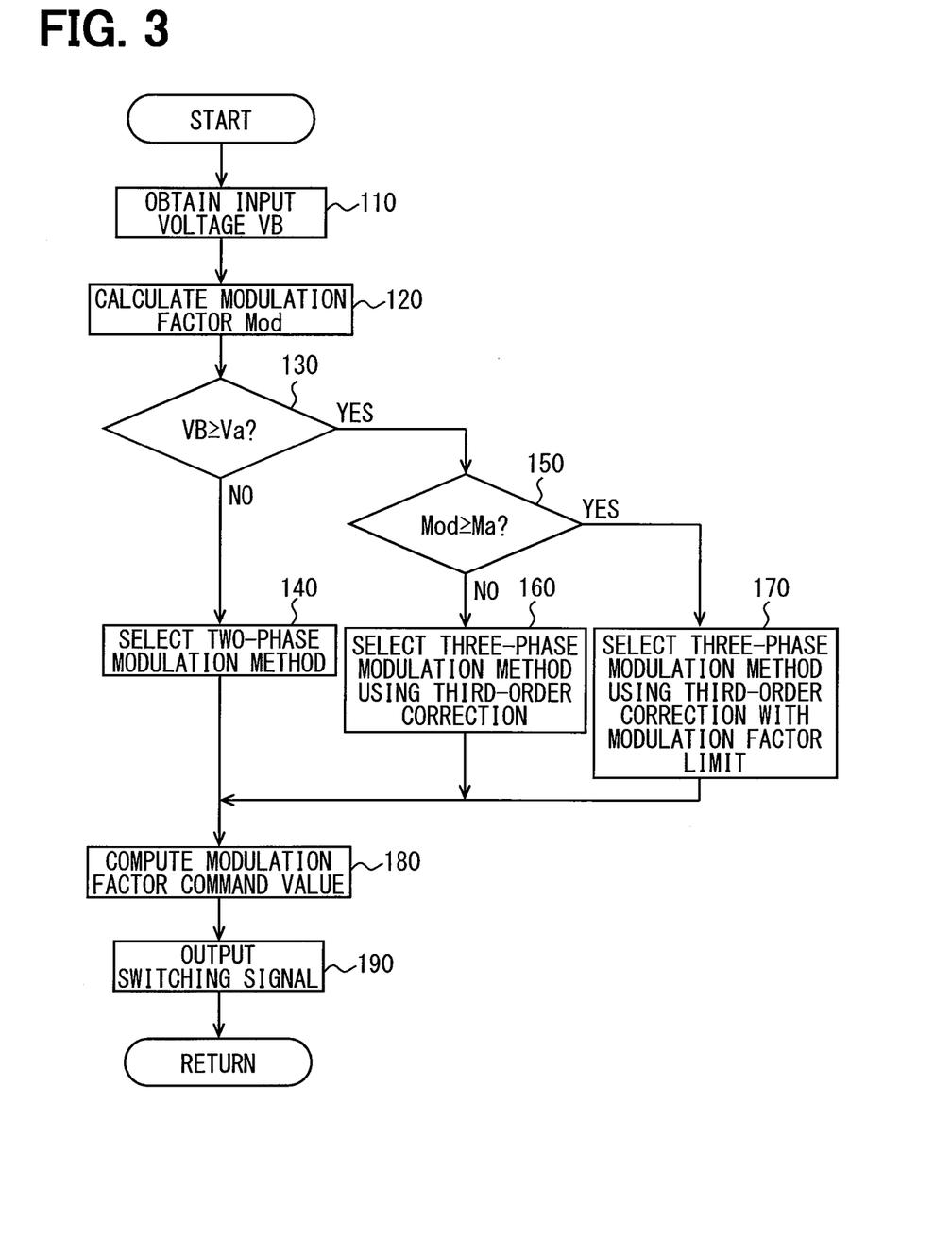
FIG. 3 is a flowchart describing an outline of a control operation of a control device.

The control device 100 repetitively performs the flow shown in FIG. 3 in predetermined control cycles. The shortest possible control cycles are preferred. By making the control cycles shorter, a preferable modulation method can be selected at good accuracy.

Owing to the flow from Step 130 to Step 180, a modulation method capable of restricting the occurrence of a surge voltage while maintain high efficiency can be selected and the modulation factor command value is calculated.

Figure 4:
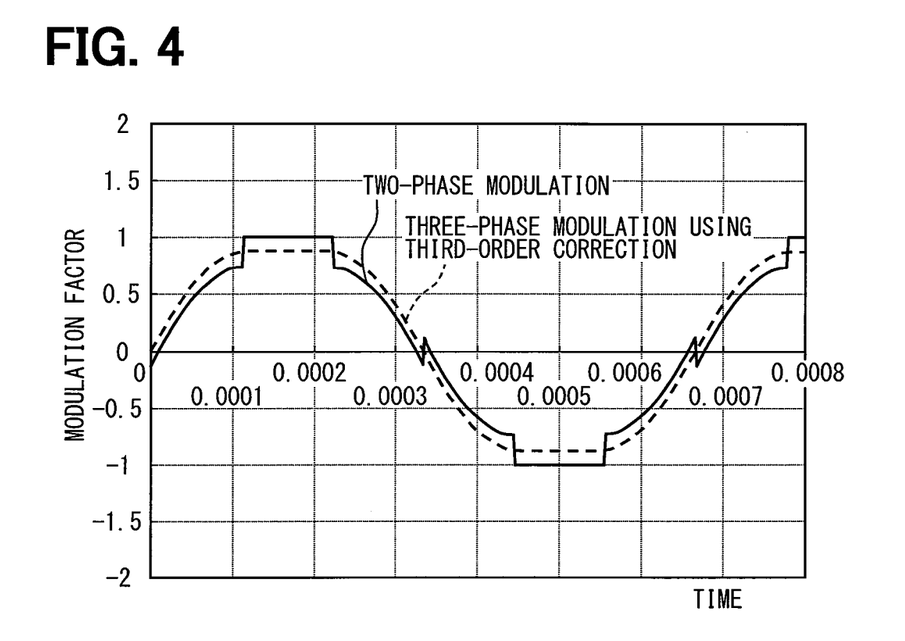
FIG. 4 shows a graph of examples of a waveform of two-phase modulation when a modulation factor of a fundamental modulation wave is relative low and a waveform of three-phase modulation using a third-harmonic correction at the same modulation factor for one phase.

For example, assume that a waveform of the two-phase modulation shown in FIG. 4 is a modulation factor waveform when it is determined at Step 130 that the input voltage VB is below the predetermined voltage Va and Step 140 and Step 180 are performed subsequently. In contrast, a modulation factor waveform at the same modulation factor Mod when it is determined at Step 130 that the input voltage VB is as high as or higher than the predetermined voltage Va and Step 160 and Step 180 are performed subsequently is a waveform of the three-phase modulation using a third-order correction shown in FIG. 4.

The two-phase modulation method shown in FIG. 4 by way of example is so-called upper and lower solid two-phase modulation in which ON and OFF states of the switching elements of the arms of three phases are fixed sequentially while the arm of each phase is fixed by fixing the upper arm and the lower arm alternately for 60 electrical degrees. To fix ON and OFF states of the switching elements means to fix the switching elements in either an ON state or an OFF state. The waveform of the two-phase modulation shown in FIG. 4 is a waveform when the modulation factor Mod is relatively small. Hence, a determination of NO is made at Step 150 and Step 160 is performed subsequently.

As is shown in FIG. 4, when the input voltage VB rises to or above the predetermined voltage Va while the two-phase modulation is performed as the normal control, that is, while the phase in which to fix ON and OFF states of the switching elements is switched, the modulation method is switched to the three-phase modulation method using a third-order correction which is the first surge restriction control method. In the waveform of the three-phase modulation using a third-order correction shown in FIG. 4, the absolute value of the modulation factor command value is less than 1 and ON and OFF states of the switching elements are not fixed. In other words, a break period of switching actions of the switching elements, during which the modulation factor command value takes 1 or −1, is not generated.

Figure 5:
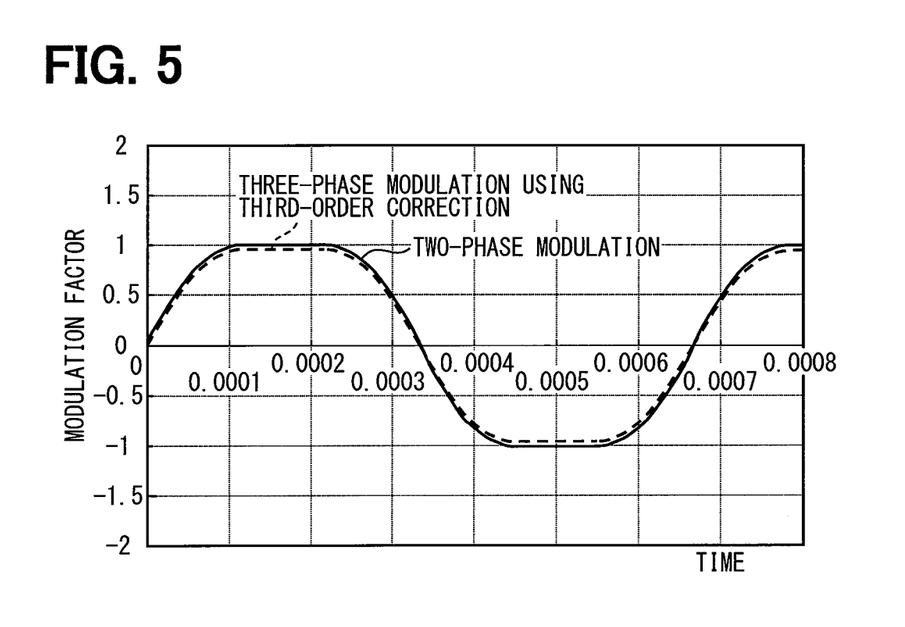
FIG. 5 shows a graph of examples of a waveform of two-phase modulation when a modulation factor of the fundamental modulation wave is higher than the modulation factor of FIG. 4 and a waveform of three-phase modulation using a third-harmonic correction with a modulation factor limit at the same modulation factor for one phase.

Also, assume that, for example, a waveform of the two-phase modulation shown in FIG. 5 is a modulation factor waveform when it is determined at Step 130 that the input voltage VB is below the predetermined voltage Va and Step 140 and Step 180 are performed subsequently. In contrast, a modulation factor waveform at the same modulation factor Mod when it is determined at Step 130 that the input voltage VB is as high as or higher than the predetermined voltage Va and Step 170 and Step 180 are performed subsequently is a waveform of the three-phase modulation using a third-order correction shown in FIG. 5.

The two-phase modulation method shown in FIG. 5 by way of example is two-phase modulation in which the modulation factor command value reaches 1 or −1 and the upper arm and the lower arm are fixed alternately in the arm of each phase. The waveform of the two-phase modulation shown in FIG. 5 is a waveform when the modulation factor Mod is relatively high. Hence, a determination of YES is made at Step 150 and Step 170 is performed subsequently.

As is shown in FIG. 5, when the input voltage VB rises to or above the predetermined voltage Va while the two-phase modulation is performed as the normal control, that is, while the phase in which to fix ON and OFF states of the switching elements is switched, the modulation method is switched to the second surge restriction control method. The second surge restriction control method is the three-phase modulation method using a third-order correction with a modulation factor limit.

In the waveform of the three-phase modulation using a third-order correction shown in FIG. 5, the absolute value of the modulation factor command value is less than 1 owing to the modulation factor limit and hence ON and OFF states of the switching elements are not fixed. In other words, a break period of switching actions of the switching elements, during which the modulation factor command value takes 1 or −1, is not generated.

Figure 7:
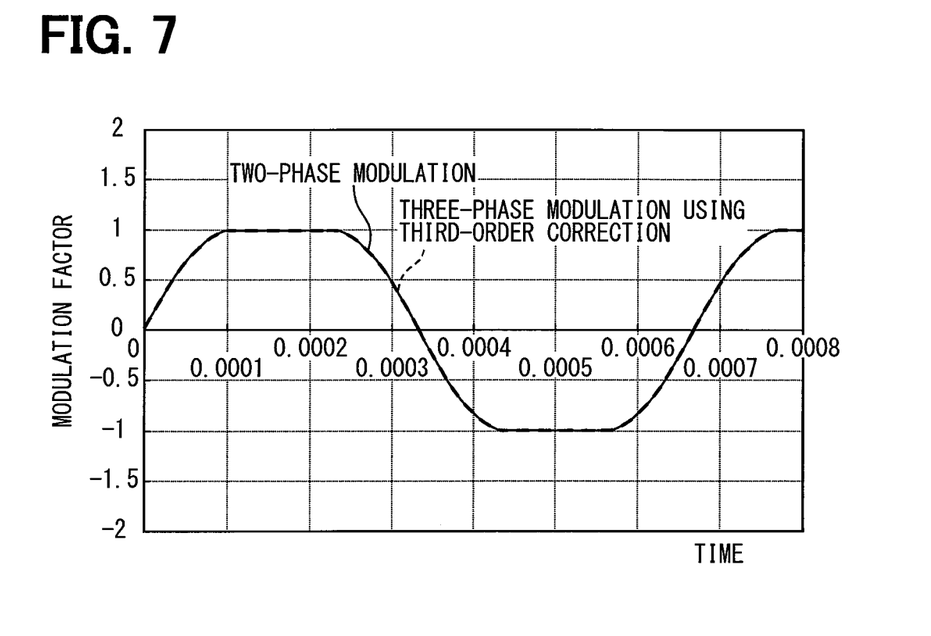
FIG. 7 shows a graph of a waveform of two-phase modulation and a waveform of three-phase modulation using a third-harmonic correction as a comparative example to a case when three-phase modulation using a third-harmonic correction with a modulation factor limit is performed.
Figure 8:
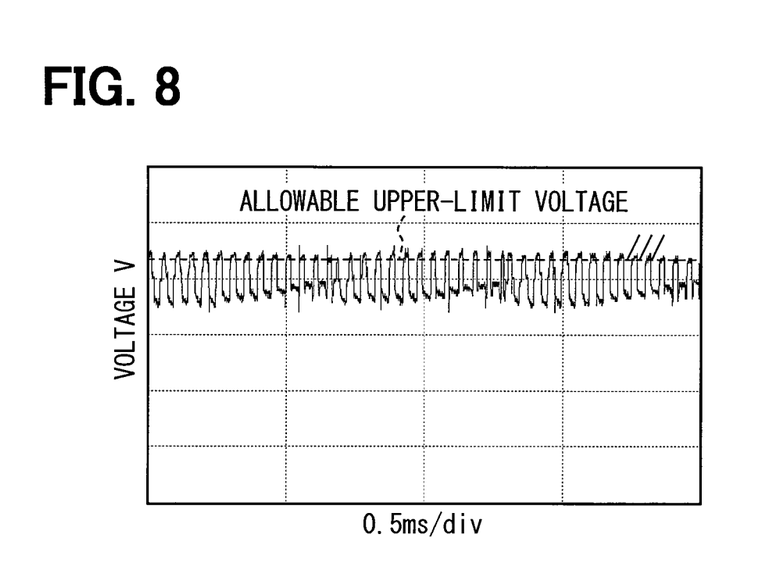
FIG. 8 shows a graph of an example of a voltage fluctuation waveform in the capacitor 70 when the two-phase modulation of FIG. 7 is performed.

In a case where the two-phase modulation method shown in FIG. 4 and FIG. 5 is used as the normal control, when the two-phase modulation is continued after the input voltage VB rises to or above the predetermined voltage Va, a surge voltage (large voltage fluctuation) increases due to discontinuous characteristics accompanying the break period. For example, when the two-phase modulation as shown in FIG. 7 is continued after the input voltage VB rises to or above the predetermined voltage Va, a surge voltage increases as shown in FIG. 8. When a large surge voltage occurs as shown in FIG. 8, the surge voltage exceeds an allowable upper-limit voltage of circuit forming components, such as the inverter circuit 40, the capacitor 70, and the coil 80.

Figure 9:
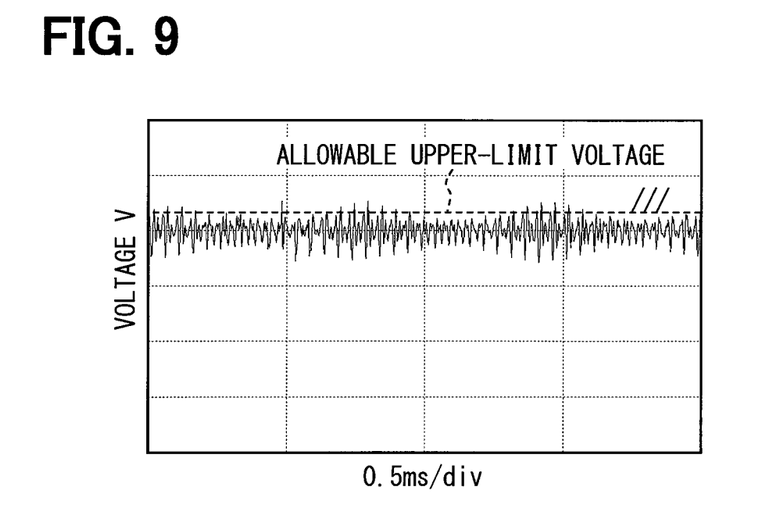
FIG. 9 shows a graph of an example of a voltage fluctuation waveform in the capacitor 70 when the three-phase modulation using a third-harmonic correction of FIG. 7 is performed.

On the contrary, generation of the discontinuous characteristics accompanying the break period as with the two-phase modulation can be eliminated in the present embodiment by using the modulation method as shown in FIG. 4 and FIG. 5, which is the three-phase modulation to which a third-harmonic correction is made. However, when the three-phase modulation using a third-harmonic correction is merely adopted in a case where the input voltage VB rises to or above the predetermined voltage Va, the modulation factor waveform is substantially the same as the modulation factor waveform of the two-phase modulation under the modulation factor condition as shown in FIG. 7. In the three-phase modulation using a third-harmonic correction shown in FIG. 7, a surge voltage drops slightly in comparison with the two-phase modulation. However, a large surge voltage occurs as shown in FIG. 9 and the surge voltage exceeds the allowable upper-limit voltage of the circuit forming components.

The inconvenience as above occurs because a period during which the modulation factor takes 1 or −1 is generated even when the three-phase modulation is used as the basis and hence the break period of the switching elements is generated, which consequently allows the discontinuous characteristics to be generated. To overcome the inconvenience as above, the modulation factor waveform in the present embodiment is generated by limiting the modulation factor so as not to take 1 or −1 as the waveform of the three-phase modulation after a third-harmonic correction of FIG. 5.

Figure 6:
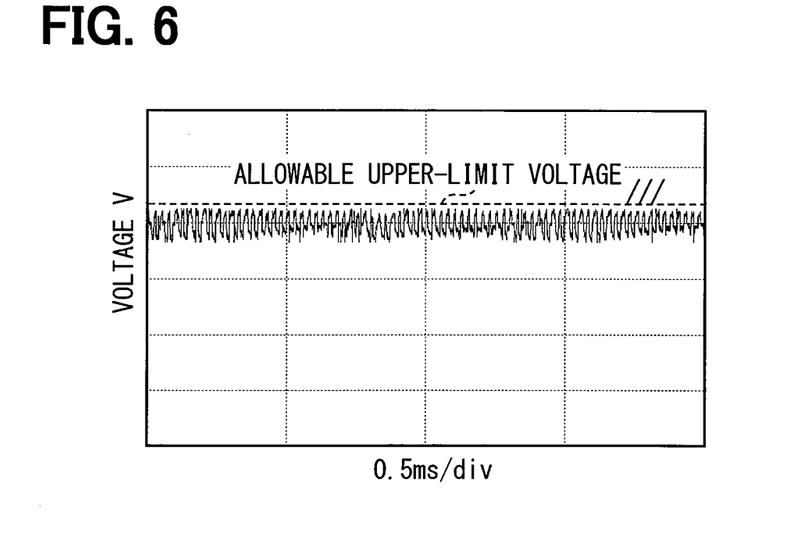
FIG. 6 shows a graph of an example of a voltage fluctuation waveform in a capacitor 70 when the three-phase modulation using a third-harmonic correction with a modulation factor limit of FIG. 5 is performed.

When the inverter circuit 40 is driven with the modulation factor waveform of the three-phase modulation using a third-harmonic correction with a modulation factor limit shown in FIG. 5, the surge voltage shapes a waveform as shown in FIG. 6. Accordingly, the surge voltage can be restricted significantly. Consequently, an event that the surge voltage exceeds the allowable upper-limit voltage of the circuit forming components can be restricted.

As is described in the flowchart of FIG. 3, the present embodiment has two types of surge restriction control selected in Steps 160 and 170. Two types of surge restriction control are present for a case where the modulation factor is limited as shown in FIG. 5 depending on the modulation factor of the fundamental modulation wave. The modulation factor is limited when the modulation factor of the fundamental modulation wave is equal to or greater than a predetermined value.

The waveforms of the three-phase modulation after a third-order correction in the surge restriction control can be calculated in accordance with Equations (1) through (3) below using magnitude of the third harmonic correction, $V_{3n}$, determined from a preliminarily set and stored map.

$$V_u = V \sin(\theta) + V_{3n} \sin(3\theta) \quad (1)$$

$$V_v = V \sin(\theta - 2/3\pi) + V_{3n} \sin(3\theta) \quad (2)$$

$$V_w = V \sin(\theta - 4/3\pi) + V_{3n} \sin(3\theta) \quad (3)$$

where $V_u$ is a U-phase voltage command, $V_v$ is a V-phase voltage command, $V_w$ is a W-phase voltage command, V is voltage amplitude, and $\theta$ is position information.

When the three-phase modulation using a third-harmonic correction shown in FIG. 4, which is the first surge restriction control, is performed, the waveforms of the respective phases are calculated in accordance with Equations (1) through (3) above. When the three-phase modulation using a third-harmonic correction with a modulation factor limit shown in FIG. 5, which is the second surge restriction control, is performed, the waveforms of the respective phases are calculated in accordance with Equations (1) through (3) above by limiting the voltage command amplitude V, which is the fundamental wave.

As has been described, Equations (1) through (3) above can be used for each of the two types of surge restriction control of the present embodiment. It should be appreciated, however, that the modulation factor waveforms of the respective phases are not limited to the waveforms calculated in accordance with Equations (1) through (3) above using the magnitude of the third harmonic correction, $V_{3n}$, pre-stored in the map. For example, it may be configured in such a manner that a map containing the contents of Equations (1) through (3) above is preliminarily set and stored to calculate the modulation factor waveforms of the respective phases according to the map.

According to the configuration and the operation described above, the control device 100 is capable of selectively switching the method used for the PWM between the two-phase modulation method and the three-phase modulation method using a third-harmonic correction with and without a modulation factor limit. The two-phase modulation method corresponds to a first modulation method by which ON and OFF states of the switching elements corresponding to at least one of three phases are fixed while ON and OFF states of the switching elements corresponding to the rest of the three phases are switched. The three-phase modulation method using a third-harmonic correction with and without a modulation factor limit corresponds to a second modulation method by which ON and OFF states of the switching elements corresponding to the three phases are switched. When the input voltage VB, which is a value of the applied voltage detected by the voltage detection device 95, rises to or above the predetermined voltage Va, which is a predetermined voltage value, while the first modulation method is selected, the control device 100 switches the method used for the PWM from the first modulation method to the second modulation method.

According to the configuration as above, the first modulation method is switched to the second modulation method when the input voltage VB into the inverter circuit 40 rises to or above the predetermined voltage Va while the first modulation method is selected. In other words, when the input voltage VB rises to or above the predetermined voltage Va while the modulation method is the method by which ON and OFF states of the switching elements of at least one of the phases are fixed, the modulation method is switched to the modulation method by which ON and OFF states of the switching elements of the three phases are switched.

Hence, in a case where the input voltage VB, which is the applied voltage, becomes relatively large, the modulation method that does not form a fixed phase in the inverter circuit 40 is selected. Accordingly, when the applied voltage is relatively large, a surge voltage occurring upon switching of the fixed phase in the inverter circuit 40 no longer occurs. As has been described, the occurrence of a surge voltage can be restricted even when the applied voltage fluctuates.

In the present embodiment, the normal control is performed by the first modulation method when the input voltage VB is below the predetermined voltage Va. Also, when the input voltage VB is as high as or higher than the predetermined voltage Va, the first or second surge restriction control is performed by the second modulation method.

In the present embodiment, a correction is made by superimposing third harmonics by the second modulation method, which is the three-phase modulation method. According to the configuration as above, the modulation method by which no fixed phase is formed in the inverter circuit 40 can be readily obtained by the three-phase modulation method.

When the input voltage VB is as high as or higher than the predetermined voltage Va and the three-phase modulation method is selected, the control device 100 inhibits ON and OFF states of the switching elements from being fixed by performing the PWM while limiting the absolute value of the modulation factor to a value less than the predetermined value.

According to the configuration as above, in a case where the absolute value of the modulation factor rises when the input voltage VB is as high as or higher than the predetermined voltage Va, an event that the fixed phase is formed can be restricted even when the three-phase modulation method is selected. Hence, the occurrence of a surge voltage can be restricted in a reliable manner even when the input voltage VB fluctuates.

When the input voltage VB is as high as or higher than the predetermined value Va and the three-phase modulation method is selected, the control device 100 performs the PWM according to the modulation wave obtained by superimposing a third harmonic on a sine wave. According to the configuration as above, the PWM can be performed according to a modulation wave obtained by adding a third harmonic to a sine wave, that is, a modulation wave that remains for a long time in a state where the absolute value of the modulation factor is relatively large. Consequently, a utilization ratio of a DC voltage can be enhanced.

The present embodiment enhances efficiency in the normal control by selecting the surge restriction control according to a voltage across the DC power supply 20 formed of, for example, a battery. As has been described, when the two-phase modulation method is used as the normal control, a break period of the switching elements can be provided and hence a switching loss can be reduced, although a slight surge voltage occurs due to the discontinuous characteristics. Accordingly, when the input voltage VB is below the predetermined voltage Va, which is a case where a surge voltage does not pose a problem, it is preferable to use the two-phase modulation.

As a countermeasure against a surge voltage, the drive circuit portion including the inverter circuit 40, the capacitor 70, the coil 80, and so on may be formed by adopting a high-breakdown voltage component having a high allowable upper-limit voltage and an excellent surge withstanding capability. However, when the high-breakdown voltage component is used, a size and the costs of the drive circuit portion are likely to increase. By performing the surge restriction control only when the input voltage VB is as high as or higher than the predetermined voltage Va, an increase in size and cost of the drive circuit portion can be restricted while the control can be performed at high efficiency by reducing a switching loss in a normal state when the input voltage VB is below the predetermined voltage Va. Advantageous effects can be achieved particularly by applying the present disclosure to a case where the input voltage VB rises to or above the predetermined voltage Va under an extremely rare condition.

As has been described, when the three-phase modulation is used as the surge restriction control in a case where the two-phase modulation is used as the normal control, a switching loss increases. However, because the surge restriction control is performed when the input voltage VB is relatively large, an increase in current due to a weak field control can be restricted. Accordingly, because a loss due to an increase in current can be reduced, the surge restriction control can be established without increasing a loss.

Although it is not described in the embodiment above, it is preferable that the control device 100 lowers a carrier wave frequency when the input voltage VB is as high as or higher than the predetermined voltage Va and the three-phase modulation method is selected in comparison with a carrier wave frequency when the input voltage VB is below the predetermined voltage Va. In other words, it is preferable to set a lower carrier wave frequency when Step 160 or Step 170 of FIG. 3 is performed than when Step 140 is performed.

According to the configuration as above, even when the formation of a fixed phase is restricted by selecting the three-phase modulation method when the input voltage VB is as high as or higher than the predetermined voltage Va, a loss can be restricted by reducing the switching times by lowering the carrier wave frequency.

It is further preferable that when the input voltage VB is as high as or higher than the predetermined voltage Va and the three-phase modulation method is selected, the control device 100 lowers the carrier wave frequency to ⅔ times or less than ⅔ times as high as the carrier wave frequency when the input voltage VB is below the predetermined voltage Va.

According to the configuration as above, even in a case where the formation of a fixed phase is restricted by selecting the three-phase modulation method when the input voltage VB is as high as or higher than the predetermined voltage Va, the switching times can be reduced to ⅔ times or less than ⅔ times as many as the switching times when the input voltage VB is below the predetermined voltage Va owing to the lowered carried wave frequency. Hence, a switching loss can be restricted up to the same level as the two-phase modulation method by which one phase out of there phases is fixed.

The DC power supply 20, which is the feed source, is mounted to the vehicle. A DC voltage outputted from the DC power supply 20 mounted to the vehicle undergoes a relatively large fluctuation. Hence, in a case where the feed source to the inverter circuit 40 is the DC power supply 20 mounted to a mobile object, it is quite effective to apply the present disclosure.

The load driven by the synchronous motor 12 is the compression mechanism 11 that draws in and compresses the refrigerant in the refrigeration cycle. The inverter 40 is cooled by the indrawn refrigerant drawn in by the compression mechanism 11.

In a case where the input voltage VB rises to or above the predetermined voltage Va and the second modulation method by which to switch ON and OFF states of the switching elements of the three phases is selected, an amount of heat generation in the inverter circuit 40 increases with an increase of a switching loss due to the configuration that does not form a fixed phase. However, because it is configured in such a manner that the inverter circuit 40 is cooled by the indrawn refrigerant drawn in by the compression mechanism 11, a temperature rise in the inverter circuit 40 can be restricted even when a switching loss increases.

Other Embodiments

While the preferred embodiment of the present disclosure has been described, it should be appreciated that the present disclosure is not limited to the embodiment above and can be implemented in various modifications within the scope and the spirit of the present disclosure.

In the embodiment above, the control device 100 is capable of selectively switching the method used for the PWM between the first modulation method and the second modulation method. The first modulation method is so-called the upper and lower solid two-phase modulation method and the second modulation method is the three-phase modulation method using a third-harmonic correction with and without a modulation factor limit. The modulation methods, however, are not limited to the methods specified above.

The first modulation method may be any method by which ON and OFF states of the switching elements corresponding to at least one of three phases are fixed while ON and OFF states of the switching elements corresponding to the rest of the three phases are switched. In addition, the second modulation method may be any method by which ON and OFF states of the switching elements corresponding to the three phases are switched.

For example, the first modulation method may be a two-phase modulation method other than the upper and lower solid two-phase modulation method. Further, the first modulation method may be a three-phase modulation method using or without using a harmonic superimposing correction, a square pulse method or the like. In addition, the first modulation method is not limited to one modulation method. For example, the first modulation method may be selectively switched from one of the modulation methods described above to another.

Also, the second modulation method may be, for example, a three-phase modulation method using a fundamental sine wave alone or a three-phase modulation method with a correction made by superimposing a waveform other than a waveform of a third harmonic on a sine wave.

Figure 10:
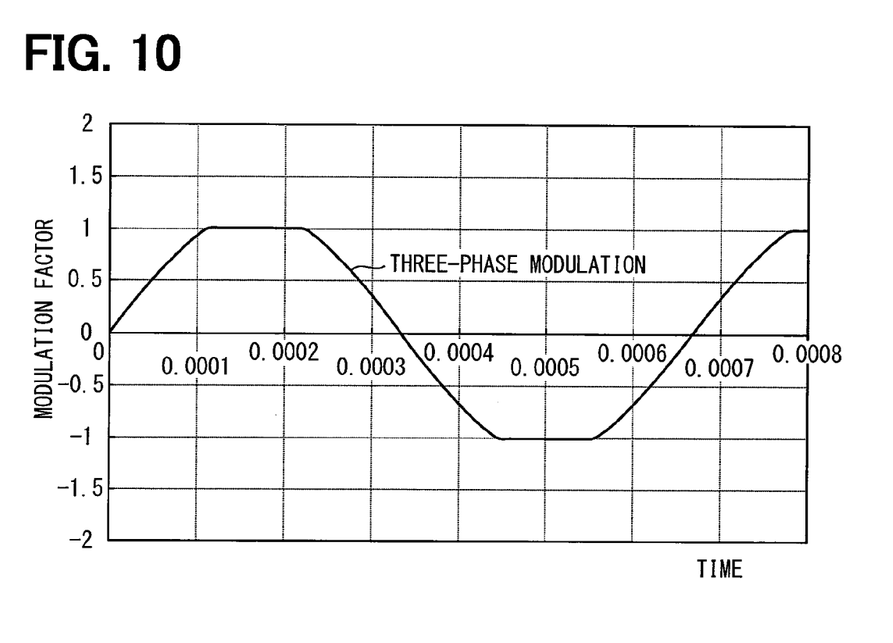
FIG. 10 shows a graph of an example when a three-phase modulation method is used as a first modulation method in another embodiment.

For example, the first modulation method may be three-phase modulation having a waveform shown in FIG. 10. When three-phase modulation using a fundamental sine wave is performed during the normal control, over-modulation occurs when a modulation factor Mod becomes high. Accordingly, the waveform is limited as shown in FIG. 10 and a break period of switching actions is generated. In a case where the input voltage VB rises to or above the predetermined voltage Va when the three-phase modulation of the waveform as above is adopted as the first modulation method, the three-phase modulation by adding a modulation factor limit to the waveform shown in FIG. 10 may be used as the second modulation method.

In other words, according to the example described above, the three-phase modulation method using a fundamental sine wave is selected at Step 140 of FIG. 3 and a fixed phase is formed according to the modulation factor Mod. On the other hand, the three-phase modulation method using a fundamental sine wave is selected at Step 160 and no fixed phase is formed because the modulation factor Mod is relatively low. Further, the three-phase modulation method using a fundamental sine wave is selected at Step 170 and no fixed phase is formed because the modulation factor Mod is relatively high and the modulation factor is limited. As has been described, when the input voltage VB rises to or above the predetermined voltage Va, the modulation method as above may be selected according to the modulation factor Mod so that no fixed phase is formed by the modulation method.

In the embodiment above, the control device 100 uses the pre-stored map when a correction is made by superimposing a third harmonic on a sine wave. However, the present disclosure is not limited to the configuration as above. For example, a function expression may be preliminarily stored and used for a computation or a calculation may be made by an approximation computation.

In the embodiment above, a carrier wave frequency is lowered when the input voltage VB is as high as or higher than the predetermined voltage Va and the three-phase modulation method is selected in comparison with a carrier wave frequency when the input voltage VB is below the predetermined voltage Va. However, the present disclosure is not limited to the configuration as above. For example, the carrier wave frequency may not be changed at all.

In the embodiment above, both of the DC power supply 20, which is the feed source, and the electric compressor 10 including the motor drive device are mounted to the vehicle. However, the present disclosure is not limited to the configuration as above. For example, it may be configured in such a manner that the feed source is mounted to the vehicle whereas the electric compressor including the motor drive device is a stationary system. Further, the feed source is not limited to a feed source mounted to the vehicle and may be mounted to a mobile object including, for example, an air plane or a vessel. Also, the electric compressor including the motor drive device may be mounted to a mobile object. In addition, the feed source is not limited to a feed source mounted to a mobile object and may be a stationary feed source.

In the embodiment above, the inverter circuit 40 is attached to the outer surface of the end wall portion of the housing 1 within which the indrawn refrigerant flows. However, the present disclosure is not limited to the configuration as above. For example, the inverter circuit may be attached to an outer surface of a tube-like portion of the housing 1. Further, the inverter circuit may be provided at a position at which, for example, the indrawn refrigerant flows inside the housing 1.

In the embodiment above, the inverter circuit 40 is cooled by the indrawn refrigerant in the compression mechanism 11. However, the present disclosure is not limited to the configuration as above. For example, the inverter circuit may release generated heat to atmosphere.

In the embodiment above, the motor drive device drives the motor when the load is the compression mechanism of the compressor disposed in the heat pump cycle of the vehicle air conditioner. However, the present disclosure is not limited to the configuration as above. The load driven by the motor may be, for example, a stationary compression mechanism or a load other than the compression mechanism.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A motor drive device comprising:
   an inverter circuit that has three switching elements arranged so as to respectively correspond to three phases of a motor having a three-phase motor coil, converts a direct-current applied voltage applied from a power source to an alternating-current voltage by a pulse width modulation according to a switching operation for switching between an on-state and an off-state of each switching element, and output the alternating-current voltage to each phase of the motor coil;
   a voltage detection device that detects the direct-current applied voltage;
   a control device that controls the PWM of the inverter circuit, wherein:
   the control device selectively switches a PWM method between a first modulation method, for fixing the on-state and the off-state of the switching element corresponding to at least one of three phases and for switching the on-state and the off-state of the switching element corresponding to the other at least one of three phases, and a second modulation method, for switching the on-state and the off-state of the switching elements corresponding to three phases; and
   the control device switches the PWM method from the first modulation method to the second modulation method when the direct-current applied voltage detected by the voltage detection device is equal to or greater than a predetermined voltage under a condition that the first modulation method is selected;
   the second modulation method is a three-phase modulation method; and
   when the direct-current applied voltage is equal to or greater than the predetermined voltage, and the three-phase modulation method is selected, the control device executes the PWM with limiting an absolute value of a modulation factor to be less than a predetermined value.

2. The motor drive device according to claim 1, wherein:
   when the direct-current applied voltage is equal to or greater than the predetermined voltage, and the three-phase modulation method is selected, the control device executes the PWM according to a modulation wave obtained by superimposing a third harmonic wave over a sine wave.

3. The motor drive device according to claim 1, wherein:
   when the direct-current applied voltage is equal to or greater than the predetermined voltage, and the three-phase modulation method is selected, the control device reduces a carrier wave frequency to be lower than a case where the direct-current applied voltage is less than the predetermined voltage.

4. The motor drive device according to claim 3, wherein:
when the direct-current applied voltage is equal to or greater than the predetermined voltage, and the three-phase modulation method is selected, the control device reduces the carrier wave frequency to be equal to or less than two-thirds times a case where the direct-current applied voltage is less than the predetermined voltage.

5. The motor drive device according to claim 1, wherein:
the power source is mounted to a mobile object.

6. The motor drive device according to claim 1, wherein:
a load driven by the motor is a compression mechanism that draws in and compresses a refrigerant in a refrigeration cycle; and
the inverter circuit is cooled by a drawn refrigerant drawn by the compression mechanism.

7. The motor drive device according to claim 1, wherein:
the predetermined voltage is an allowable upper-limit voltage of circuit forming components of the motor drive device.

8. The motor drive device according to claim 7, wherein:
the circuit forming components include the inverter circuit, a capacitor, and a coil.

9. The motor drive device according to claim 1, wherein the predetermined value is 1.

10. The motor drive device according to claim 9, wherein the absolute value of the modulation factor is less than 1 such that a break period of a switching action of the switching elements is not generated.

* * * * *